United States Patent [19]

Mori

[11] Patent Number: 6,084,685
[45] Date of Patent: Jul. 4, 2000

[54] MULTIFUNCTION INFORMATION PROCESSING SYSTEM FOR PERFORMING OPERATIONS IN PARALLEL AND STORAGE MEDIUM FOR USE BY THE SAME

[75] Inventor: Hiromi Mori, Nagoya, Japan

[73] Assignee: Brother Kogyo Kabushiki Kaisha, Nagoya, Japan

[21] Appl. No.: 08/951,680

[22] Filed: Oct. 16, 1997

[30] Foreign Application Priority Data

Oct. 18, 1996 [JP] Japan ..................................... 8-276719

[51] Int. Cl.$^7$ ....................................................... G06F 13/12
[52] U.S. Cl. ........................................ 358/1.14; 358/1.12
[58] Field of Search ..................................... 395/114, 112, 395/200.47, 200.49, 825, 826, 828, 834, 838–839, 859, 872; 358/407, 442, 448, 468, 1.12, 1.14; 709/217, 219; 710/5, 6, 8, 14, 18, 19, 39, 52

[56] References Cited

U.S. PATENT DOCUMENTS 4,816,911  3/1989  Kirsch et al. .
5,307,462  4/1994  Hastings ................................. 395/275
5,506,657  4/1996  Ito et al. ................................. 355/202
5,845,076  12/1998  Arakawa ............................ 395/200.33

*Primary Examiner*—Mark K. Zimmerman
*Assistant Examiner*—Lance W. Sealey
*Attorney, Agent, or Firm*—Oliff & Berridge, PLC

[57] ABSTRACT

A multifunction information processing system includes a host device and a multifunction peripheral device. Data is transmitted from the host device to the multifunction peripheral device in units of data packets whose header includes an identification flag of a driver of the host device. In the same way, data is also transmitted from the multifunction peripheral device to the host device in units of data packets whose header includes the identification flag of the driver program that corresponds to the unit of the multifunction peripheral device that is sending the data. The data packets to be transmitted or received are arranged as a temporal sequence. The host device and the multifunction peripheral device perform the data transmission and data reception operations in parallel through time-sharing.

14 Claims, 8 Drawing Sheets

MULTIFUNCTION INFORMATION PROCESSING SYSTEM FOR PERFORMING OPERATIONS IN PARALLEL AND STORAGE MEDIUM FOR USE BY THE SAME

CROSS REFERENCE TO RELATED APPLICATION

This application is based on and claims priority from Japanese Patent Application No. Hei-8-276719 filed on Oct. 18, 1996, the contents of which are incorporated herein by reference.

BACKGROUND OF THE INVENTION

1. Field of the Invention

The present invention relates to a multifunction information processing system that has a host device, which may be a computer or the like, and a multifunction peripheral device, which may be a facsimile device with a printing function, that perform communication operations with each other. The present invention also relates to a computer program product that is stored in a storage medium that can be used in such a multifunction information processing system.

2. Description of Related Art

Multifunction peripheral devices, which have a plurality of functions and which act as peripheral equipment for computers, are now being developed. An example of such a multifunction peripheral device is a facsimile device that has a printing function. The facsimile device that has the printing function is configured to print data received from external devices such as a computer, a word processor and the like using its printer unit that usually prints facsimile data.

After receiving the facsimile data received from other facsimile devices and the like via a communication line, the facsimile device with the printing function prints facsimile data. In addition, the facsimile device with the printing function receives data transmitted by the computer and prints such data received from the computer.

Another type of multifunction peripheral device is the multifunction peripheral device that has expanded the functions of the facsimile device with the printing function. This type of multifunction peripheral device can send data received from a facsimile device or data read through its scanner unit to a computer and send facsimiles based on data transmitted by the computer. In this way, the computer can centrally control facsimile data receipt and transmission operations. The multifunction peripheral device is very useful in that it can transmit data read by the scanner unit to the computer, which can then edit the data, and subsequently receive edited data from the computer for facsimile transmission. In this way, with the multifunction peripheral device, facsimile data can be checked without the need for printing by displaying the data on the display of the computer and previously received facsimile data can be stored for subsequent usage.

Communication operations between the computer and the multifunction peripheral device (which may be a facsimile device having printing functions) are performed by printer driver and facsimile driver programs activated by the computer and a data communication program executed by the multifunction peripheral device. The aforementioned operations can be executed when a user issues commands and settings based on instructions displayed in the display of the computer.

However, in these aforementioned systems, communication operations between the respective driver programs of the computer and the data communication program of the multifunction peripheral device can only be performed for only one driver program at any time. In this way, the above-described operations cannot be executed in parallel.

That is, in conventional systems, when the multifunction peripheral device is being used as a printer by the computer whose printer driver program is sending print data to the multifunction peripheral device, the facsimile driver program of the computer will not be able to perform data communication operations with the facsimile unit of the multifunction peripheral device. Thus, the multifunction peripheral device cannot send facsimile data to the computer when it is performing the printing operation. Similarly, the multifunction facsimile data cannot perform facsimile transmission to external facsimile devices while it is performing the printing operation.

SUMMARY OF THE INVENTION

In view of the foregoing problems in the prior art, it is a primary object of the present invention to provide a multifunction information processing system that can execute a plurality of operations in parallel. Another objective of the present invention is to provide a computer program product stored in an information storage medium for use by such multifunction information processing system.

To achieve these objects, a first aspect of the present invention provides an information processing system that includes a multifunction peripheral device and a host device. The multifunction peripheral device includes an image scanner unit and an image generator unit. The host device includes a scanner activation unit for activating the image scanner unit and a generator activation unit for activating the image generator unit. The multifunction peripheral device executes a transmission operation to transmit in parallel through time-sharing a first data from the image scanner unit and a second data from the image generator unit to the host device. The multifunction peripheral device also executes a reception operation to receive in parallel through time-sharing a third data from the scanner activation unit and a fourth data from the generator activation unit. Furthermore, the multifunction peripheral device executes the transmission operation and the reception operation in parallel through time-sharing. Meanwhile, the host device executes a transmission operation to transmit in parallel through time-sharing the third data from the scanner activation unit and the fourth data from the generator activation unit to the multifunction peripheral device. In addition, the host device may execute a reception operation to receive in parallel through time-sharing the first data from the image scanner unit and the second data from the image generator unit. Moreover, the host device executes a control operation to perform in parallel through time-sharing the transmission operation and the reception operation.

In this way, simultaneous data reception and data transmission operations can be performed between the host device and the multifunction peripheral device.

Another aspect of the present invention provides a computer program product for driving a computer. Here, the computer has a scanner activation unit that activates an image scanner unit of a multifunction peripheral device and a generator activation unit that activates an image generator unit of the multifunction peripheral device. The computer program product includes a computer usable medium having computer readable program code embodied therein. The computer program product also includes computer readable program code for causing the computer to transmit in parallel through time-sharing a first data from the scanner activation unit and a second data from the generator activation unit to the multifunction peripheral device. The computer program product also has computer readable program code for causing the computer to receive in parallel through time-sharing a third data from the image scanner unit and a fourth data from the image generator unit. Moreover, the computer program product has computer readable program code for causing the computer to execute the transmission and reception operations in parallel through time-sharing.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENT

Figure 1:
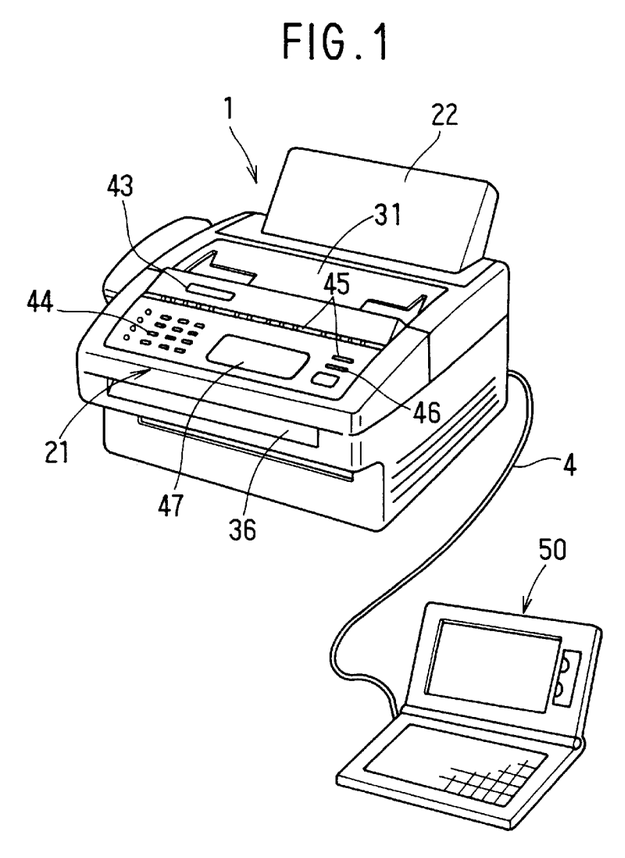
FIG. 1 is a perspective view illustrating a computer and a multifunction peripheral device of a multifunction information processing system according to a preferred embodiment of the present invention.
Figure 2:
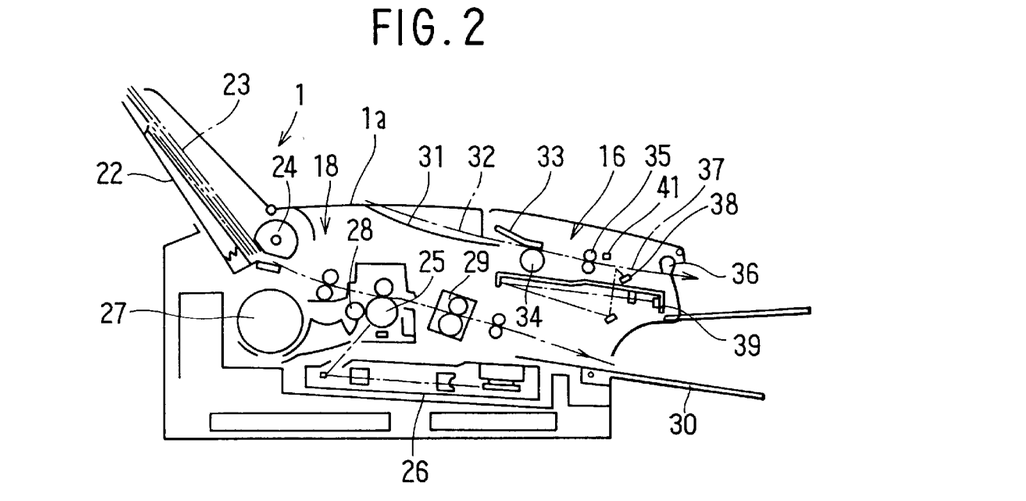
FIG. 2 is a schematic cross-sectional view of the multifunction peripheral device according to the preferred embodiment of the present invention.
Figure 3:
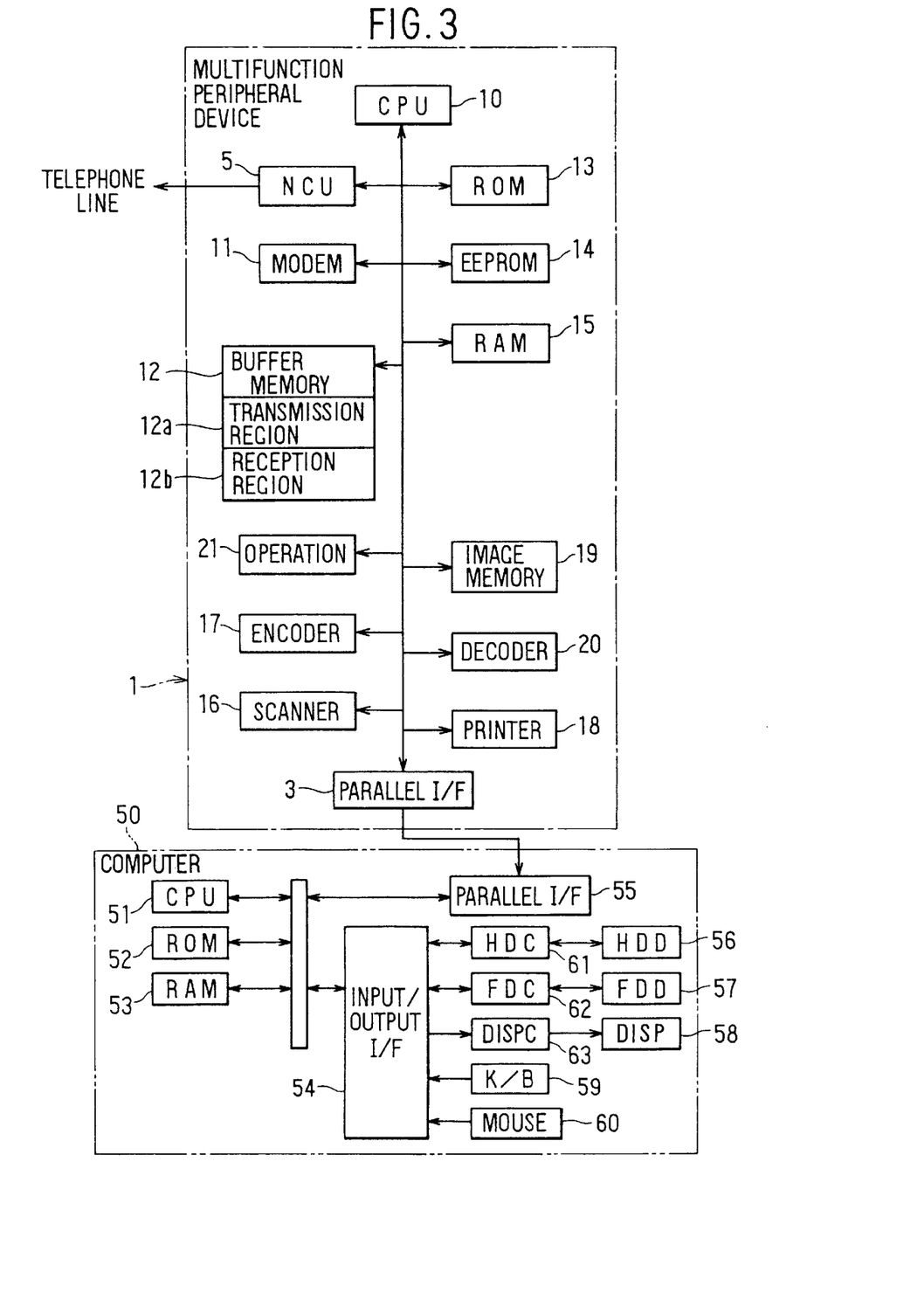
FIG. 3 is a block diagram illustrating the construction of hardware of the information processing system according to the preferred embodiment of the present invention.

A preferred embodiment of the present invention is described hereinafter with reference to FIGS. 1 through 9. As shown in FIG. 1, a multifunction information processing system of the present invention includes a computer 50 (also referred to as a host device), which may be a personal computer (PC) or the like, and a multifunction peripheral device 1. As shown in FIGS. 1 to 3, the multifunction peripheral device 1 and the computer 50 are connected to each other via a parallel interface (I/F) 3, a cable 4 and a parallel I/F 55 so that they can communicate with each other.

The multifunction peripheral device 1 mainly includes a facsimile unit that performs facsimile operations, a printer unit 18 that prints data transmitted by the facsimile unit or the computer 50 on recording paper, and a scanner unit 16 that scans images and transmits the scanned image to the facsimile unit or the computer 50. The computer 50 generates operation command signals for controlling each unit of the multifunction peripheral device 1. The multifunction peripheral device 1 transmits facsimile data or scanned data to the computer 50. Moreover, the computer 50 transmits facsimile data to another facsimile device via the facsimile unit of the multifunction peripheral device 1.

The construction of each unit of the multifunction peripheral device 1 and the construction of the computer 50 are explained in detail hereinafter.

As shown in FIG. 3, the multifunction peripheral device 1 further includes an NCU (network controller unit) 5, a CPU 10, a modem 11, a buffer memory unit 12, a ROM unit 13, an EEPROM unit 14, a RAM unit 15, a scanner unit 16, an encoder 17, a printer unit 18, an image memory unit 19 and a decoder 20.

The NCU 5, which is a part of the facsimile unit, executes communication line control operations. The multifunction peripheral device 1 is connected to a telephone line via the NCU 5. The CPU 10 is connected via a bus line to the other various units of the multifunction peripheral device 1 and controls such various units to perform facsimile operations, that is, data communication operations following a predetermined communication control procedure.

The modem 11 converts digital image signals into analog signals and transmits the analog signals to the outside via the telephone line and the NCU 5. The modem 11 also converts the analog image data signals transmitted from the outside via the telephone line and the NCU 5 into digital signals, and performs transmission and reception of various communication control signals.

The buffer memory unit 12 includes a plurality of regions such as a transmission buffer region 12a and a reception buffer region 12b which are for temporarily storing encoded image data that are transmitted to and received from the outside via the telephone line.

The ROM unit 13 stores a control program for controlling the printer unit 18, the scanner unit 16 and the facsimile unit. The EEPROM unit 14 stores various data such as preset dial numbers, name of parties to be called and one-touch dial numbers. The contents of the EEPROM unit 14 remain intact even if the multifunction peripheral device 1 is deactuated. The RAM unit 15 temporarily stores data for various operations.

As shown in FIG. 2, the scanner unit 16 is an apparatus for reading images from a set of documents 32. The construction and operation of the scanner unit 16 is explained hereinafter. The documents 32 are placed on a document table 31 disposed at an upper side of the body 1a of the multifunction peripheral device 1. A separator 33 and a first carrier roller 34 separate each sheet of the document 32 and transport each sheet towards a pair of second carrier rollers 35. When one sheet of document 32 (which is set facing downwards in the present embodiment) is being transported from the pair of the second carrier rollers 35 towards a paper release roller 36, a light source 38 of a reading member 37 disposed between the rollers 35 and 36 irradiates the sheet of document 32. The resulting reflection light from the sheet of document 32 enters a reading head 39 (which may be a line image sensor and the like) via lenses and reflectors. In this way, the reading head 39 generates the image data of every sheet of document 32.

The encoder 17 shown in FIG. 3 encodes the image data read by the scanner unit 16. The facsimile unit externally transmits the encoded image data in sequence via the transmission region 12a of the buffer memory unit 12. The facsimile unit may also transmit the encoded image data immediately or at a designated time after the image data is temporarily stored in the image memory unit 19. This transmission function of the facsimile unit using the image memory unit 19 is very convenient in case the facsimile device that will receive the image data is busy or data is to be transmitted to a plurality of devices.

The facsimile unit transmits not only the image data read by the scanner unit 16 but also the data transmitted by and received from the computer 50. Image data read by the scanner unit 16 and processed by the computer 50, and text file generated by the computer 50 and converted to facsimile data are examples of data that are transmitted to the outside by the facsimile unit.

During normal data reception operations in which the facsimile unit stores data in real time, the facsimile unit receives image data transmitted from another facsimile device via the telephone line after executing a predetermined communication control operation with such facsimile device. The facsimile unit subsequently stores the received image data in the reception buffer region 12b of the buffer memory unit 12. Thereafter, the decoder 20 decodes (that is, expands) the image data, converts the image data into a dot image for printing page by page and stores the dot image in a bit image storage region of the image memory 19. The image data are expanded according to a predetermined resolution, and the resulting image data are transmitted to the printer unit 18 for printing page by page.

As shown in FIG. 1, an operation unit 21 of the facsimile unit has a display 43 (which may be a liquid crystal display or the like for displaying the operating condition of the facsimile unit and characters used for storing the names of the parties to be called), numeric keys 44, function keys 45, one-touch memory keys 46, abbreviation keys 47 and the like.

Here, the facsimile unit sends the received facsimile data to the computer 50 which may store the data as files. Furthermore, in the information processing system according to the present embodiment, the image data read by the scanner unit 16 could be transmitted by the facsimile unit to the computer 50 which may store the scanned data in a file. In turn, the computer 50 can process the stored image data and send the processed image data to the multifunction peripheral device 1 for printing or facsimile transmission to other facsimile devices.

Next, the printer unit 18 which acts as an image generator is explained hereinafter. The printer unit 18 records data (e.g., image stored in the image memory 19, data received by the facsimile unit, data transmitted by the computer 50 and stored in the image memory unit 19, etc.) as hard copy on recording paper.

In other words, the image data received from the computer 50 is temporarily stored in the image memory unit 19. The image data may then be printed by the printer unit 18 with the CPU 10 controlling these data input/output and storage processes.

Details of the construction of the printer unit 18 are explained hereinafter with reference to FIG. 2. A paper supply cassette 22 is provided at a rear portion of the body 1a of the multifunction peripheral device 1. Recording paper 23 in the paper supply cassette 22 is supplied toward a photoreceptor drum 25. Next, a light scanning unit 26 projects laser light scanning rays on the photoreceptor drum 25 to generate a latent image on the same drum 25. The latent image is developed by using toner provided by a toner cartridge 27 and a developing unit 28 and is then copied on the recording paper 23. The recording paper 23 subsequently passes through a fixing unit 29, which includes a heating roller and pressure roller and which fixes the image. The recording paper 23 then goes to a delivery tray 30. In this way, the printer unit 18 of the present embodiment is an electrostatic electronic image recording type printer. It must be noted that a thermal-type printer and the like that prints images on heat sensitive paper may also be used as the printer unit 18.

Meanwhile, as shown in FIG. 3, the computer 50, which is the host device, includes a CPU 51, a ROM unit 52, a RAM unit 53, an input/output I/F 54 and a two-way parallel I/F 55. The CPU 51 includes a microprocessor and the like. The ROM unit 52 is for storing control programs and the like. The RAM unit 53 is for storing various data including image data read by the scanner unit 16 of the multifunction peripheral device 1. The input/output I/F 54 has input/output ports while the two-way parallel I/F 55 also has input/output ports for communicating with the multifunction peripheral device 1.

The computer 50 further includes a hard disk drive (HDD) 56, a floppy disk drive (FDD) 57, a display (which may be a CRT) 58, a keyboard 59 and a mouse 60, all of which are connected to the input/output I/F 54. The hard disk drive 56, the floppy disk drive 57 and the display 58 are connected to the input/output I/F 54 via a hard disk drive controller (HDC) 61, a floppy disk drive controller (FDC) 62 and a display controller (DISPC) 63, respectively.

The parallel I/F 3 and the parallel I/F 55 are two-way communication I/F that facilitate communication between the computer 50 and the multifunction peripheral device 1. Through the parallel I/F 3 and the parallel I/F 55, the computer 50 controls the scanner unit 16 to read data, the printer unit 18 to generate the image and the facsimile unit to receive and transmit data via the NCU 5 and the like.

Figure 4:
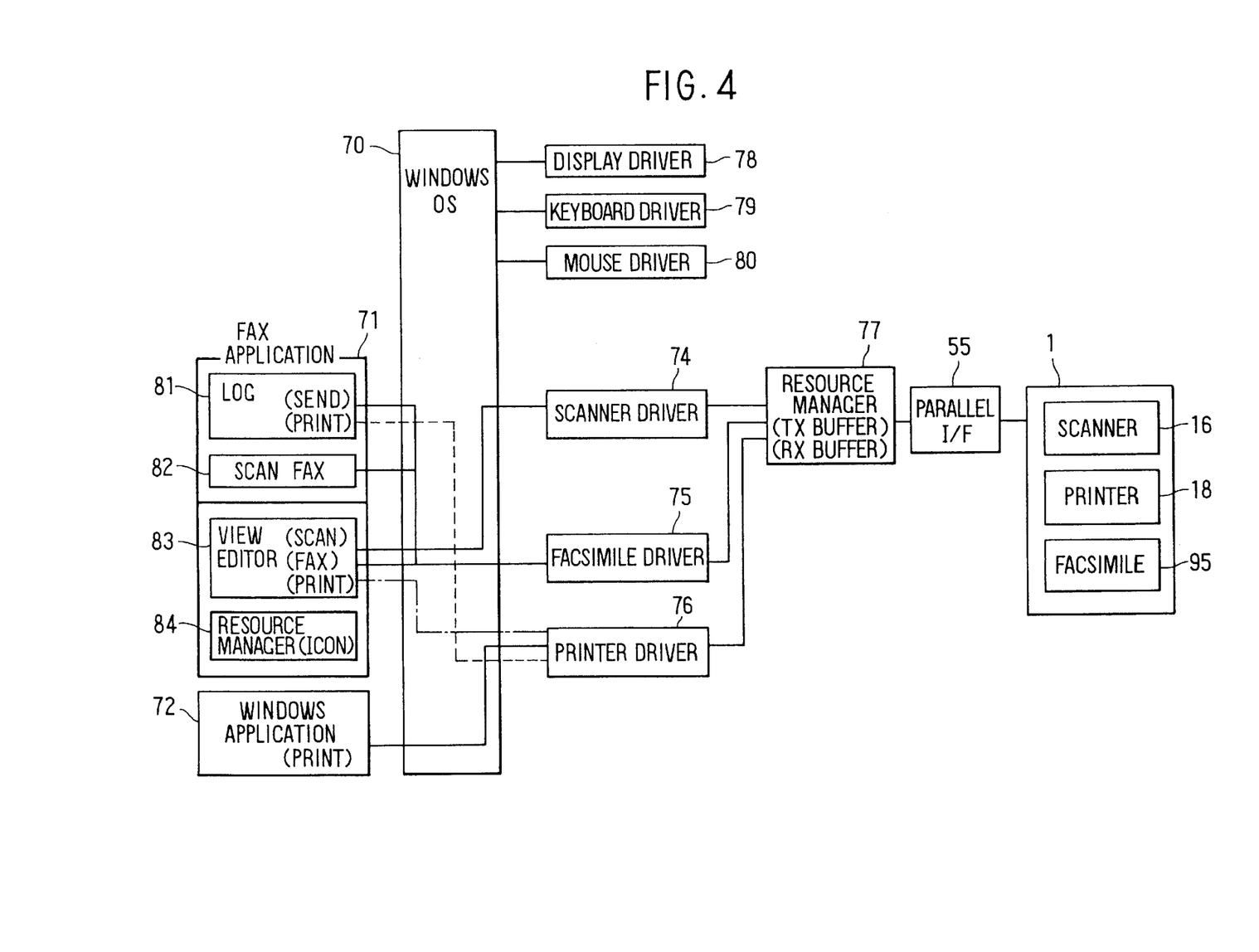
FIG. 4 is a block diagram illustrating the construction of software of the information processing system according to the preferred embodiment of the present invention.

With the hardware construction of the information processing system of the present invention explained in the above, the software of the information processing system will be explained hereinafter with reference to FIG. 4. In the present embodiment, as shown in FIG. 4, the operating system (OS) 70 of the computer 50 is the WINDOWS operating system. A FAX application program 71 for implementing the scanning, printing and facsimile functions of the multifunction peripheral device 1 and general application programs 72 such as word processing software run on the OS 70. These application programs and other programs such as drivers and the like are installed (stored) in the HDD 56 and the like beforehand with the CPU 51 executing these programs to implement the various operations.

The FAX application program 71 is an application program of the multifunction peripheral device 1 that enables the computer 50 to operate the multifunction peripheral device 1 as a facsimile device.

When the FAX application program 71 is in operation, buttons such as a log button 81, a scan fax button 82 and the like for implementing the various operations of the multifunction peripheral device 1 are displayed on the display 58. These operations are executed by clicking the respective buttons displayed on the display 58. For example, when the log button 81 is clicked, a log manager program is actuated. The log manager program manages transmission and reception records of the facsimile data and displays such transmission and reception records on the display 58. When the transmission and reception records is displayed on the display 58, a user can designate a specified transmission file and the like and click a "send" command icon displayed on the display 58 to transmit such file again.

When the "send" command is selected, the log manager program provides the name of the selected transmission file and a facsimile transmission command to a facsimile driver program 75. After receiving the facsimile transmission command, the facsimile driver program 75 transmits the data for facsimile transmission to the multifunction peripheral device 1 via a resource manager program 77. The facsimile driver program 75 transmits the data for facsimile transmission together with other various control signals (that is, control signals for implementing the facsimile transmission) that include a start signal for the facsimile transmission operation.

When the log manager program is in operation and a "print" command is selected, the transmission and reception record is printed by the multifunction peripheral device 1. In this case, the log manager program provides the name of the file to be printed and the print command to a printer driver program 76. The printer driver program 76 transmits various control signals (that is, control signals necessary for print operations) including print data and a print start signal to the multifunction peripheral device 1 via the resource manager program 77.

Furthermore, the log manager program may be actuated automatically when, for example, the facsimile driver program 75 indicates the storage of newly-received data with the log manager program displaying the data reception record and the like on the display 58.

When the scan fax button 82 is clicked, the facsimile driver program 75 sends a document scan command to the scanner unit 16 of the multifunction peripheral device 1 via the resource manager program 77. Accordingly, the document 32 provided on the document table 31 of the multifunction peripheral device 1 is carried by the carrier rollers 34 and 35 and is scanned by the reading head 39. The multifunction peripheral device 1 then sends the scanned data to the facsimile driver program 75 via the resource manager program 77. Thereafter, the facsimile driver program 75 provides the transmission record information to the log manager program and then sends the scanned data to the facsimile unit 95 of the multifunction peripheral device 1 via the resource manager program 77. In this way, the facsimile unit 95 of the multifunction peripheral device 1 performs the facsimile transmission of the scanned data.

The FAX application program 71 also facilitates the facsimile transmission of revised image data that is displayed on the display 58 of the computer 50 and scanned through the scanner unit 16 and the facsimile transmission of files stored in the HDD 56 and the like of the computer 50. A view editor program 83 for implementing the above-described functions is provided in the FAX application program 71. Aside from the FAX application program 71, the view editor program 83 can also be activated by other application programs. Furthermore, the view editor program 83 activates when a file (that is, a file that stores data received via the facsimile unit 95 or data read by the scanner unit 16) having specified file extension is opened.

In this way, the view editor program 83 is for storing data received by the facsimile unit 95 or data scanned by the scanner unit 16 in the computer 50 and for displaying such data on the display 58. After displaying the data, the view editor program 83 can be used to edit the image data by deleting parts of the image data, adding text, and the like.

Aside from opening a file that has the predetermined file extension, the view editor program 83 may also be activated by placing a document 32 on the document table 31 of the multifunction peripheral device 1. Furthermore, the view editor program 83 can also be activated by clicking a view editor program icon displayed on the display 58. At any rate, when the view editor program 83 is activated, a menu is displayed on the display 58 from which a user can select a command from among those displayed. For example, the menu includes a FAX button and when this FAX button is clicked, a scan setting window is displayed. The scan setting window enables the setting of scanning conditions such as resolution, scanning size and the like.

Therefore, after setting the suitable scanning conditions on the scan setting window, the user may click a start button in the scan setting window to make the view editor program 83 send scanning condition information and a transmission request for the scan start command to the facsimile driver program 75. Then, the facsimile driver program 75 transmits the scanning condition and the scan start command to the multifunction peripheral device 1 via the resource manager program 77.

After the multifunction peripheral device 1 receives the scanning conditions and the scan start command, its scanner unit 16 performs the scanning operation based on designated scanning conditions and the multifunction peripheral device 1 sends the scanned data to the facsimile driver program 75 via the resource manager program 77. Thereafter, the facsimile driver program 75 stores the data in the RAM 53. Thereafter, the facsimile driver program 75 informs the view editor program 83 of the receipt of the read data (scanned data) and hands over control of the data to the view editor program 83 before terminating its own operations. In response, the view editor program 83 displays the scan data stored in the RAM 53 on the display 58 and superimposes a display of the setting conditions of the facsimile transmission on such display of the scan data. In this way, the user may designate where to send the facsimile transmission on the setting screen. When the user clicks the start button, the view editor program 83 provides the scan data as facsimile transmission data and the transmission request for starting facsimile transmission to the facsimile driver program 75. After providing the transmission status information to the log manager program, the facsimile driver program 75 sends the aforementioned scan data to the facsimile unit 95 of the multifunction peripheral device 1 via the resource manager program 77. Thereafter, the facsimile unit 95 of the multifunction peripheral device 1 executes the facsimile transmission of the scanned data.

While the facsimile driver program 75 sends signals for scanning a document and for requesting the transmission of scan data when the FAX button or the scan FAX button 82 is clicked, these functions may also be executed by other programs. For example, the scanner driver program 74 may also send signals for scanning a document and for requesting the transmission of the scanned data.

When the scan button is selected from the menu of the view editor program 83, the scanner unit 16 of the multifunction peripheral device 1 performs the scanning operation based on the command from the scanner driver program 74. The scanned data are displayed on the window screen of the view editor program 83 in the same way as in the case of the facsimile transmission. When the user selects, for example, the storage of data in the HDD 56, the view editor program 83 retrieves the scan data stored in the RAM 53 and stores the scan data in the HDD 56 under a suitable filename.

The printer driver program 76 is activated when the print button is selected from among the menu selections of the view editor program 83. The printer driver program 76 controls the printer unit 18 of the multifunction peripheral device 1 to print the image data on recording paper.

Meanwhile, when a general application program 72 such as word processing software and the like is activated, selection of a command such as print and the like in such application program 72 results in the activation of the printer driver program 76 with the display of a screen for setting resolution, paper size, contrast and the like and for executing the start command of the printing operation. That is, by selecting a print command in the application program 72, the printing operation is performed via the printer driver program 76.

In general, the method of access of the computer 50 with respect to the scanner unit 16, the printer unit 18 or the facsimile unit 95 varies depending on the hardware construction of the scanner unit 16, the printer unit 18, the facsimile unit 95 or the computer 50 itself. In this way, it will be troublesome to adjust access methods of the application programs 71 and 72 to suit various hardware. Accordingly, with the provision of driver programs 74, 75 and 76 between the application programs 71 and 72 and the multifunction peripheral device 1, and with these driver programs 74, 75 and 76 enabling the CPU 51 to operate as a driving command unit of the multifunction peripheral device 1, the access methods from the application programs 71 and 72 are standardized. At the same time, the driver programs 74, 75 and 76 are set to deal with changes in hardware, operating systems and the like.

Similarly, a display driver program 78 for controlling the display 58, a keyboard driver program 79 for controlling the keyboard 59 and a mouse driver program 80 for controlling the mouse 60 work on the OS 70.

In the present embodiment, the resource manager program 77 is provided for supervising two-way data communication between the above-described driving programs 74, 75 and 76 and the multifunction peripheral device 1. The resource manager program 77 activates when the OS 70 is activated. If the resource manager program 77 is inactive (that is, closed) at the time the driver programs 74–76 are activated, the driver programs 74–76 automatically activate the resource manager program 77. After the activation of the resource manager program 77, an icon 84 indicating the resource manager program 77 is displayed on the display 58. When the operation of the resource manager program 77 needs to be stopped temporarily, a user may click the icon 84 to terminate the operation of the resource manager program 77.

Meanwhile, both the scanner driver program 74 and the printer driver program 76 may be activated even if the FAX application program 71 is inactive. For example, the respective driver programs are activated when "print" and "scan" commands are generated from the view editor program 83 or the application program 72, which may be a word processing application or the like. In case the resource manager program 77 is inactive, the respective driver programs activate the resource manager program 77 and secure transmission and reception buffers (input and output buffers) for facilitating data communication with the multifunction peripheral device 1. The FAX application program 71 and the facsimile driver program 75 are usually active and thus, the resource manager program 77 is also usually active. That is, the resource manager program 77 needs to remain ready to receive data at any time because it is impossible to know when the multifunction peripheral device 1 will transmit the facsimile data received from other facsimile devices and the like to the computer 50.

The scanner driver program 74, the facsimile driver program 75 and the printer driver program 76 may access the resource manager program 77. The resource manager program 77 receives control data or the like from the respective driver programs 74–76 and sends such data in packets to the multifunction peripheral device 1 with identification data affixed to the control data to identify the driver program from which the data is coming from. In addition, the resource manager program 77 also delivers the data packet transmitted from the multifunction peripheral device 1 to the respective driver. In this way, control operations based on the transmitted and received data are performed by the respective driver programs and the multifunction peripheral device 1.

Communication operations between the CPU 51 and the multifunction peripheral device 1 are performed by activating the resource manager program 77 which makes the CPU 51 of the computer 50 act as a data transmission unit, as a data reception unit and as a reception and transmission controller. Accordingly, the CPU 51 transmits transmission requests from the computer 50 to the multifunction peripheral device 1 at a predetermined interval. In addition, the CPU 51 receives data sent by the CPU 10 of the multifunction peripheral device 1 to the computer 50 in response to the transmission requests.

Regarding the transmission of data from the computer 50, each driver program generates the transmission data and sends the transmission request to the resource manager program 77. When there is data that needs to be transmitted, the resource manager program 77 transmits such data to the multifunction peripheral device 1.

However, there are cases when the driver programs generate the transmission requests at the same time. In addition, there are cases when facsimile data received by the multifunction peripheral device 1 needs to be sent to the computer 50 while the computer 50 is sending data to the multifunction peripheral device 1.

In this way, through the resource manager program 77, the computer according to the present invention aims to perform parallel transmission of data provided by the respective driver programs through time-sharing, parallel transmission of data to the respective driver programs through time-sharing and the parallel execution of the data transmission and data reception processes through time-sharing.

Furthermore, in the same way, through the execution of a communication program for performing communication operations with the host device (that is, the computer 50), the multifunction peripheral device 1 makes its CPU 10 function as a data transmission unit, as a data reception unit and as a transmission and reception controller. In addition, the CPU 10 aims to perform parallel transmission of data provided by the various units of the multifunction peripheral device 1 through time-sharing, parallel transmission of data to such respective units through time-sharing and the parallel execution of data transmission and data reception processes through time-sharing.

Figure 5:
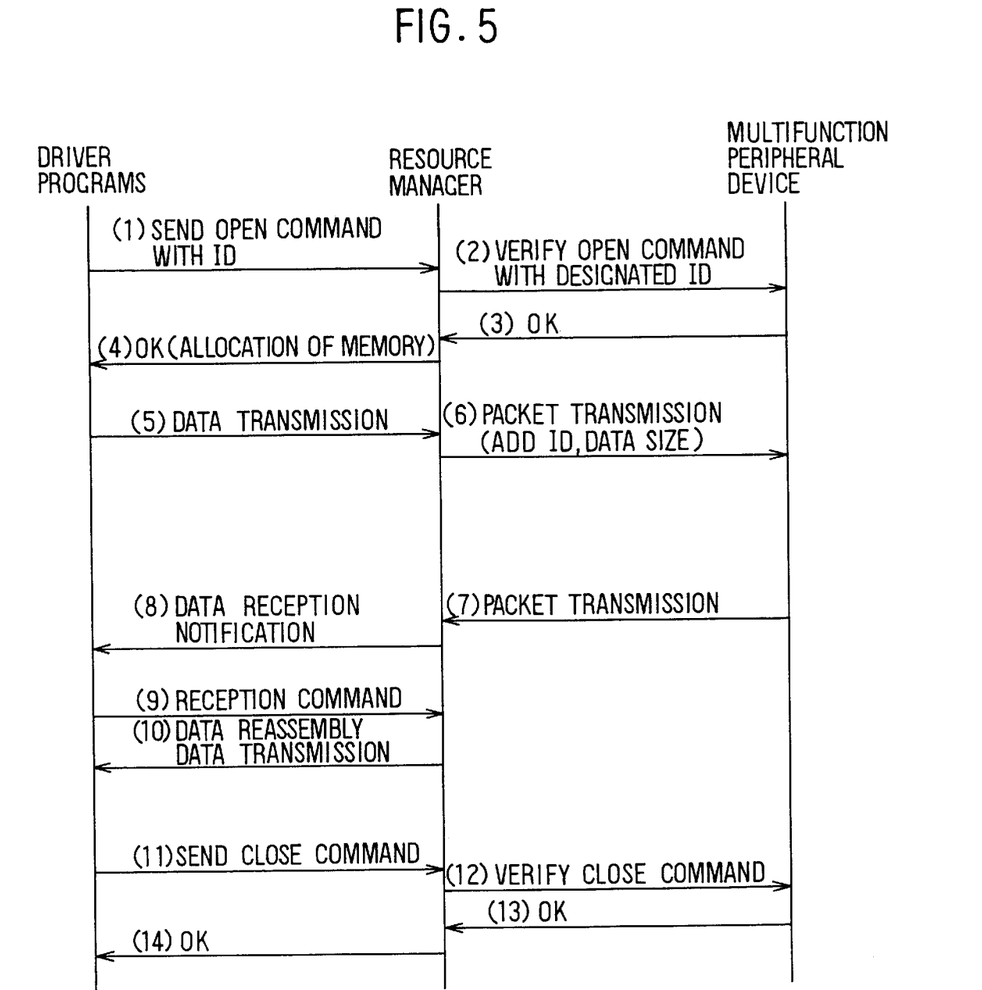
FIG. 5 is a timing chart showing a main communication protocol between a host device, which is the computer, and the multifunction peripheral device according to the preferred embodiment of the present invention.
Figure 7:
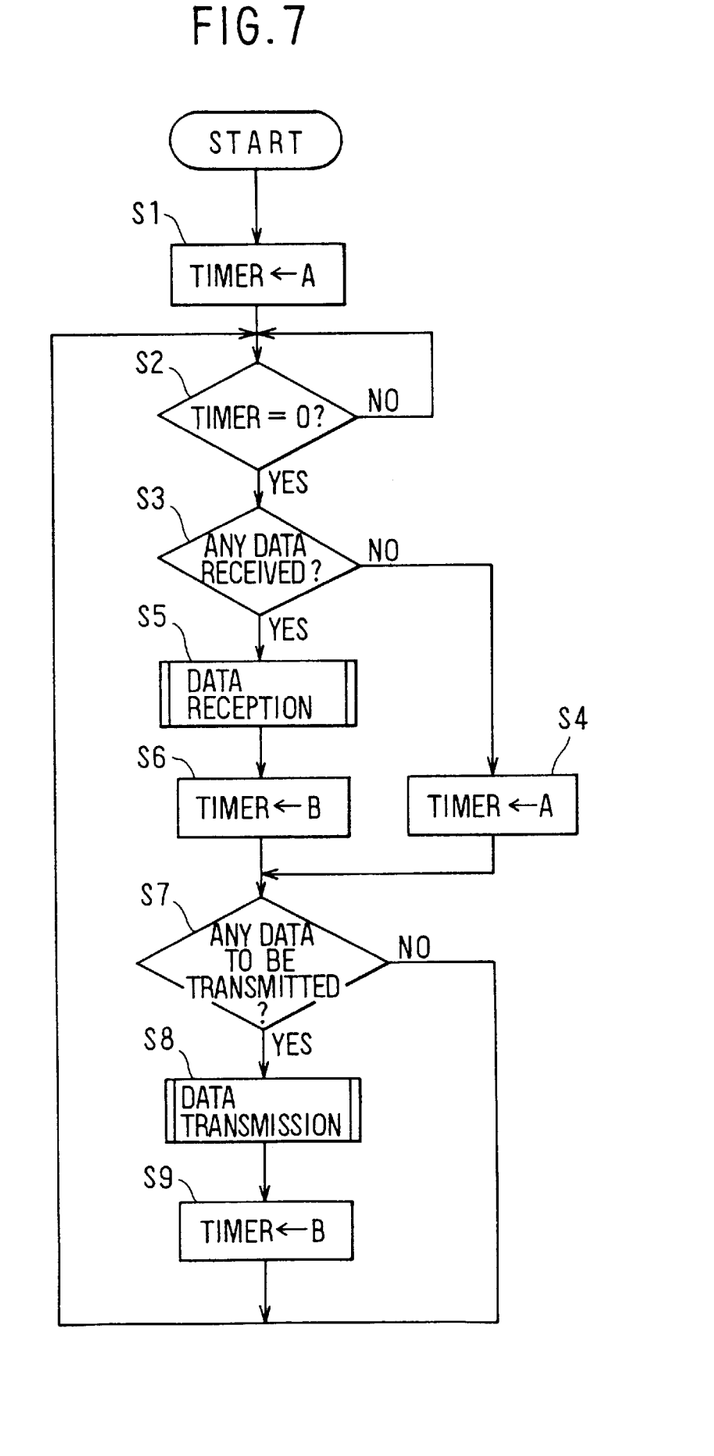
FIG. 7 is a flowchart of a main communication process executed by a resource manager program of the computer according to the preferred embodiment of the present invention.
Figure 8:
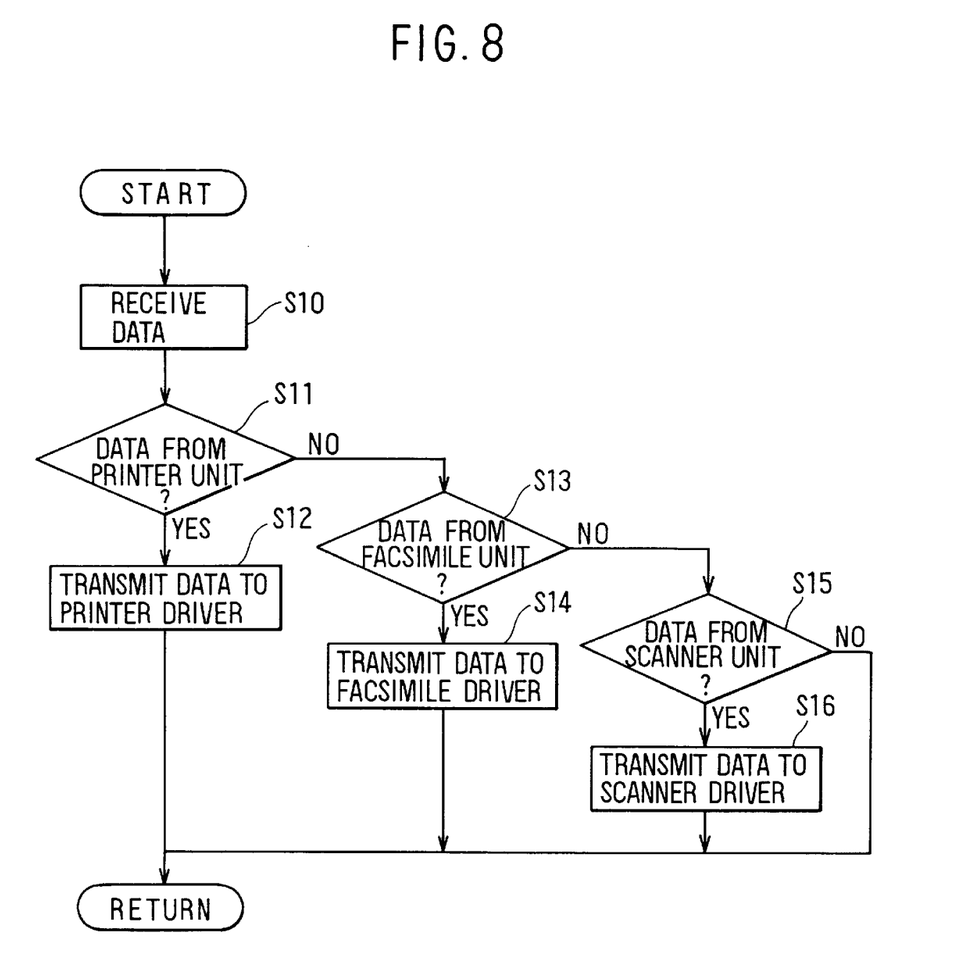
FIG. 8 is a flowchart of a data reception process executed by the resource manager program according to the preferred embodiment of the present invention.
Figure 9:
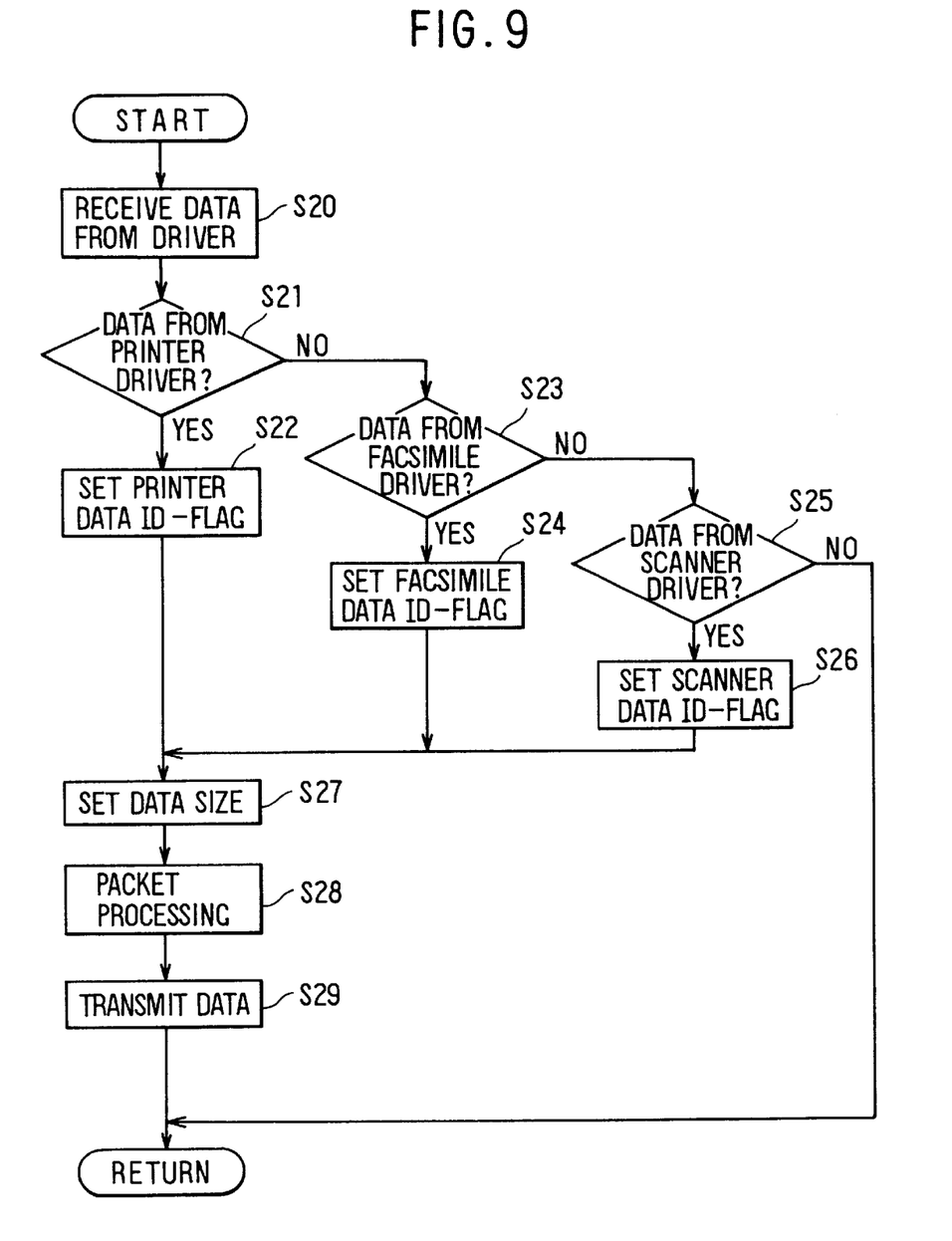
FIG. 9 is a flowchart of a data transmission process executed by the resource manager program according to the preferred embodiment of the present invention.

Hereinafter, the transmission and the reception operations of the multifunction information processing system are explained based on the operations of the resource manager program 77 and with reference to the timing chart of FIG. 5, the diagrams shown in FIGS. 6A to 6C and the flow charts of FIGS. 7 to 9.

The basic communication protocol of the resource manager program 77 is explained hereinafter. As shown in FIG. 5, in (1), one of the driver programs sends an open command (that is, a command for securing input/output buffer memory space on the RAM 53) to the resource manager program 77. Accordingly, in (2), the resource manager program 77 sends the open command together with its identification flag to the multifunction peripheral device 1 and determines if the multifunction peripheral device 1 is ready to transmit data to or receive the data from the driver program which has the corresponding identification flag. When the multifunction peripheral device 1 responds in (3) that it is ready to receive data from the driver program, the resource manager program 77 in (4) allocates an input/output buffer region for the data from the corresponding driver program and informs the corresponding driver program of the allocation of such buffer memory region. In this way, with the allocation of buffer memory, the driver program in (5) transmits the transmission data to the resource manager program 77 which stores the data in the allocated buffer memory region. Then, as indicated in (6), the resource manager program 77 processes the data into data packets by affixing (that is, adding) an identification flag, which serves as a transmission identification for identifying from what driver program the transmission data is from, and data size information, which serves as the header of the data packet, to the data. The resource manager program 77 then sends the transmission data as data packets to the multifunction peripheral device 1. Upon receipt of the transmission data, the multifunction peripheral device 1 refers to the identification flag of each data packet to determine the driver program from which the data is from and processes each data packet to perform corresponding predetermined operations commanded by the corresponding driver program.

Figure 6A:
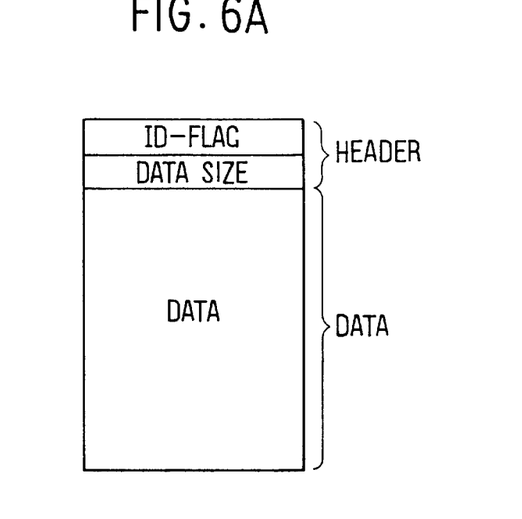
FIGS. 6A–6C show the construction of data being transmitted and received between the host device and the multifunction peripheral device according to the preferred embodiment of the present invention.

The construction of the data packet generated by the resource manager program 77 is shown in FIG. 6A. As shown in FIG. 6A, each data packet has a header that includes an identification flag, which serves as the transmission identification information or the reception identification information for the respective driver programs, and data size information. The actual transmission data follows the header. During packet transmission, the resource manager program 77 divides the transmission data into data packets of the same size with the size of each data packet being indicated in the header.

The multifunction peripheral device 1 also processes data into data packets. As shown in (7) of FIG. 5, the multifunction peripheral device 1 sends data in data packets to the resource manager program 77. In (8), based on the identification flag (which serves as the reception identification information) contained in the header of each data packet, the resource manager program 77 determines the corresponding driver program and informs the corresponding driver program of the reception of data. When there was a transmission request (or reception command (a)) from the corresponding driver program, in (10), the resource manager program 77 restores (that is, reassembles) the data based on the data packets and stores the reassembled data in the input buffer for the driver program.

In (11), when the driver program sends a close command (which is for releasing the allocated input/output buffer memory) to the resource manager program 77 after performing its prescribed operations, the resource manager program 77 verifies in (12) the close command with the multifunction peripheral device 1. After the multifunction peripheral device 1 verifies in (13) the closure command, the resource manager program 77 in (14) releases the input/output buffer memory allocated in accordance with the open command of (1) and informs the driver program of the closure operation.

The basic communication protocol of the multifunction information processing system according to the present embodiment of the present invention has been described above. In the present embodiment, when there is an open command from any of the driver programs, the resource manager program 77 allocates an input/output buffer memory region on the RAM 53. Thereafter, when a close command is subsequently transmitted by the driver program, the resource manager program 77 releases the allocated input/output buffer memory region. For example, when there is an open command from the printer driver program 76 after it is activated, the resource manager program 77 allocates an input/output buffer memory region on the RAM 53 for the printer driver program 76. Thereafter, after performing prescribed printing operations, the printer driver program 76 sends a close command to the resource manager program 77 which then releases the allocated input/output buffer memory region. The information processing system of the present invention employs the above-described arrangement of allocating and releasing the buffer memory for the following reason.

Because memory resources are quite limited and because only the driver program to which a buffer memory region is allocated has sole access to such buffer memory region, it will be inefficient to continue allocating buffer memory regions to driver programs that are not even active. However, the facsimile driver program 75 may need to be allocated with the buffer memory so that the facsimile driver program 75 can be able to receive facsimile data at any time.

The communication operations performed by the information processing system according to the present embodiment of the present invention are explained hereinafter with reference to FIGS. 7–9.

After the resource manager program 77 is activated, step S1 activates a timer (which may be based on an internal clock of the computer 50) and sets the initial value of the timer to "A". The timer counts down from its initially set value and is controlled by the OS 70 for switching tasks between the resource manager program 77 and other programs that are being executed.

That is, after the resource manager program 77 sets the timer to a predetermined value, the OS 70 temporarily stops the execution of the resource manager program 77 and executes other programs that are being run in parallel with the resource manager program 77. Then, when the timer value becomes zero, the OS 70 again resumes the execution of the resource manager program 77.

To put it more concretely, the resource manager program 77 does not resume its operations until the timer value becomes zero; that is, the operations of the resource manager program 77 remain suspended while step S2 is still giving a negative output. When the value of the timer becomes zero, that is, when step S2 gives a positive output, step S3 transmits the transmission request to the multifunction peripheral device 1 in order to determine whether or not there is reception data to be received from the multifunction peripheral device 1. When step S3 gives a negative output, that is, when step S3 determines that there is no reception data from the multifunction peripheral device 1 in response to the transmission request, control goes to step S4 which sets the timer value to "A" again. In order for the computer 50 to determine the existence of the reception data, the multifunction peripheral device 1 may transmit a message to the computer 50 that indicates that there is no data with the computer 50 being set to determine such message. It may also be that the computer 50 is arranged to wait for a response from the multifunction peripheral device 1 for a predetermined time period. In this arrangement, the computer 50 determines that there is no data from the multifunction peripheral device 1 when it does not receive any data within the predetermined time period. Here, in the present embodiment, the computer 50 determines the existence of reception data by checking port signals of the parallel I/F 55.

Next, when step S7 checks for the presence of transmission data from any of the driver programs 74–76 and determines that there is no such transmission data (that is, step S7 gives a negative output), control goes back to step S2 with the value of the timer set to "A". The execution of this process will remain suspended until the timer value becomes zero. Therefore, when there is no reception data and no transmission data, the resource manager program 77 performs transmission of the transmission requests to the multifunction peripheral device 1 and the determination of the existence of transmission data from the driver programs 74–76 at every time interval "A". It must be noted that the determination of the existence of transmission data from the driver programs 74–76 may be executed using messages.

Meanwhile, when there is reception data from the multifunction peripheral device 1, that is, when step S3 gives a positive output, control goes to step S5 which executes a data reception process. As shown in the flowchart of FIG. 8, step S10 performs the data reception operation. Based on the identification information, subsequent steps determine to which driver program the data is intended for and provide the data to the appropriate driver program. That is, when step S11 determines that the data is from the printer unit 18 of the multifunction peripheral device 1, control goes to step S12 that transmits the data to the printer driver 76. Meanwhile, if step S13 determines that the data is from the facsimile unit 95 of the multifunction peripheral device 1, control goes to step S14 that transmits the data to the facsimile driver 75. Moreover, if step S15 determines that the data is from the scanner unit 16 of the multifunction peripheral device 1, control goes to step S16 that transmits the data to the scanner driver 74.

After the completion of the data reception process, control goes to step S6 that sets the value of the timer to "B". It must be noted that the timer value "B" is smaller than the timer value "A". Step S7 determines if there is any data to be transmitted from any of the driver programs 74–76. When there is no transmission data, that is, when step S7 gives a negative output, control returns to step S2 which suspends the execution of this process of the resource manager program 77 until the timer, whose timer value of "B" is set in step S6, becomes zero.

Therefore, when reception data exists and there is no transmission data, the time interval for transmitting the transmission requests to the multifunction peripheral device 1 is set to "B". Because the timer value "B" is set to be smaller than the timer value of "A", the interval for transmitting transmission requests to the multifunction peripheral device 1 when there is data received from the same peripheral device 1 is shorter than the interval when there is no data received.

Figure 6B:
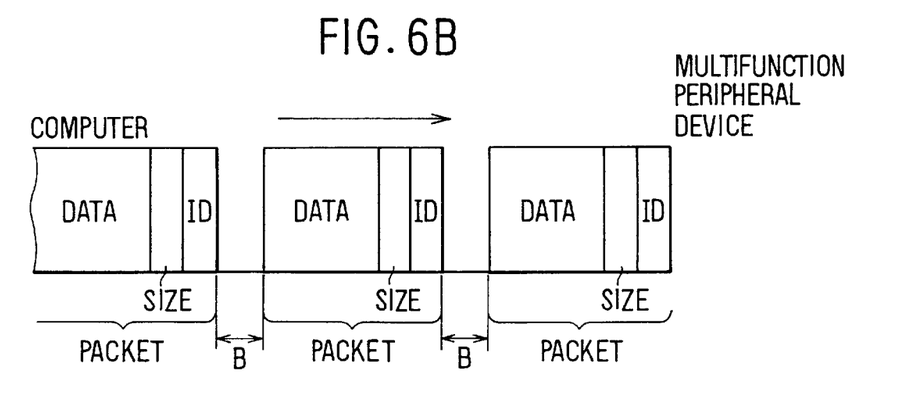
Figure 6C:
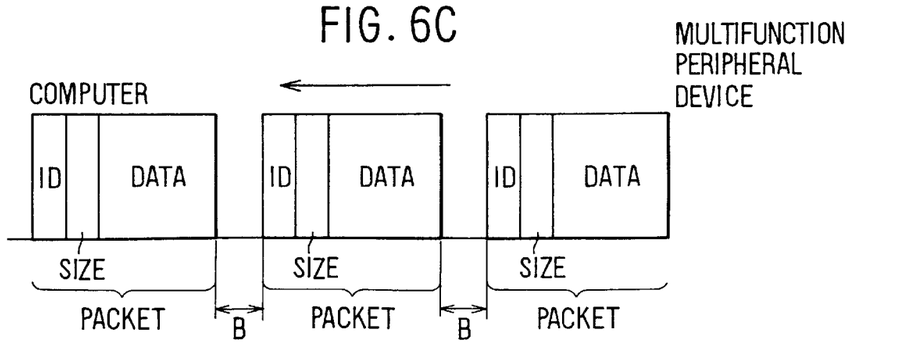

As shown in FIG. 6C, the reception of data from the multifunction peripheral device 1 involves the reception of a sequence of data packets with the time interval between individual packets being set to "B". Because each data packet can be data from the facsimile unit 95, the printer unit 18 or the scanner unit 16, these data packets arranged as a temporal series indicate the parallel reception of different types of data. The arrangement of the data packets in the temporal series is arbitrary. That is, for example, the series of data packets may all be data from the facsimile unit 95. It may also be that a data packet containing data from the printer unit 18 lies in the middle of a series of data packets containing data from the facsimile unit 95.

When there is transmission data from a driver program, that is, when step S7 gives a positive output, control goes to step S8 that executes a data transmission process. As shown in FIG. 9, in this data transmission process, step S20 receives the data from the driver. Subsequent steps determine which driver transmitted the data and sets the identification flag of the appropriate driver as the identification flag of the data. That is, when step S21 determines that the data is from the printer driver program 76, control goes to step 22 which sets the identification flag that is indicative of the printer driver 76 as the identification flag of the data. Meanwhile, when step S23 determines that the data is from the facsimile driver 75, control goes to step S24 which sets the identification flag that is indicative of the facsimile driver 75 as the identification flag of the data. Moreover, when step S25 determines that the data is from the scanner driver 74, control goes to step S26 which sets the identification flag that is indicative of the scanner driver 74 as the identification flag of the data.

After setting the appropriate identification flag, step S27 generates the header by setting data indicative of the size of the data. Subsequent step S28 processes the transmission data into data packets by affixing the header to the actual transmission data.

Control then goes to step S29 which transmits the data packet to the multifunction peripheral device 1. The transmission data may include data for printing by the printer unit 18 and data for facsimile transmission by the facsimile unit 95.

After the execution of the above-described transmission process, step S9 sets the value of the timer to "B" and control then goes to step S2 which suspends this process of the resource manager program 77 until the value of the timer becomes zero. That is, when no reception data exists and there is transmission data, the time interval for determining the existence of the transmission data is set to be shorter than the case when there is no transmission data. In this way, the transmission operation of the computer 50 can be performed at high-speed.

That is, as shown in FIG. 6B, the transmission of data to the multifunction peripheral device 1 involves the transmission of a sequence of data packets with the time interval between individual packets being set to "B". Because each data packet can be data from the scanner driver program 74, the facsimile driver program 75 or the printer driver program 76, these data packets arranged as a temporal series indicate the parallel transmission of different types of data.

According to the present embodiment, the data from each driver program is alternately arranged and transmitted by outputting the data packet of the input and output buffers sequentially in order of the buffer which become full of data first among the input and output buffers for the driver programs. However, the data packets may be arranged arbitrarily. That is, for example, the series of data packets may all be data for facsimile transmission. It may also be that a data packet containing data for printing by the printer unit 18 lies in the middle of a series of data packets containing data for facsimile transmission.

Also, as explained before, the computer 50 can execute data reception and data transmission operations in parallel through time-sharing. That is, the computer 50 can transmit data to the multifunction peripheral device 1 while receiving data from the multifunction peripheral device 1. Thus, the multifunction peripheral device 1 can be utilized more efficiently.

In this way, the present invention provides a useful and efficient data processing system because it enables the parallel execution of the printing operations, facsimile operations and scanning operations of the multifunction peripheral device 1. That is, for example, while the multifunction peripheral device 1 is performing the printing operation, a facsimile data may be received from the outside with such facsimile data being sent to the computer 50 so that a user can verify the facsimile data through the display 58 of the computer 50.

The present invention having been described should not be limited to the disclosed embodiment, but it may be modified in many other ways without departing from the scope and the spirit of the invention.

For example, although the same timer is used for the data reception process and the data transmission process of the resource manager program 77, different timers may also be used for these processes. In this way, while the time values "A" and "B" are used for both transmission of transmission requests and the transmission checks, with the use of separate timers, the time interval for sending the transmission requests and the time interval for sending the transmission checks may be set to different values. Moreover, while the above embodiment is explained with reference to the multifunction peripheral device 1 provided with a scanner function, a printer function and a facsimile function, the present invention is not limited to such peripheral device and may be applied to systems that execute digital data communication. Furthermore, although the parallel I/F is used for data communication in the aforementioned information processing system, a serial I/F may also be employed.

In addition, the resource manager program 77 and the driver programs 74–76 may be stored in storage media such as CD-ROM, floppy disks or the like. When these programs are stored in such storage media, these programs need to be read by the computer 50 to execute them.

Such changes and modifications are to be understood as being included with the scope of the present invention as defined by the appended claims.

What is claimed is:

1. An information processing system, comprising:
   a multifunction peripheral device that includes a first processor unit and a second processor unit; and
   a host device that includes a first activation unit for activating said first processor unit and a second activation unit for activating said second processor unit,
   wherein:
      said multifunction peripheral device is for executing a first transmission operation to transmit in parallel through time-sharing in an integrated mode a first data in a form of data packets from said first processor unit and a second data in a form of data packets from said second processor unit to said host device, for executing a first reception operation to receive in parallel through time-sharing in an integrated mode a third data in a form of data packets from said first activation unit and a fourth data in a form of data packets from said second activation unit, and for executing a first control operation to perform in parallel through time-sharing to comprise a further integrated mode said first transmission operation and said first reception operation, and
      said host device is for executing a second transmission operation to transmit in parallel through time-sharing in an integrated mode said third data from said first activation unit and said fourth data from said second activation unit to said multifunction peripheral device, for executing a second reception operation to receive in parallel through time-sharing in a further integrated mode said first data from said first processor unit and said second data from said second processor unit, and for executing a second control operation to perform in parallel through time-sharing in a further integrated mode said second transmission operation and said second reception operation, and said multifunction peripheral device further includes:
         a peripheral device transmission unit for executing said first transmission operation;
         a peripheral device reception unit for executing said first reception operation; and
         a peripheral device control unit for executing said first control operation to activate in parallel through time-sharing using an integrated mode said peripheral device transmission unit and said peripheral device reception unit, and
      said host device further includes:
         a host device transmission unit for executing said second transmission operation;
         a host device reception unit for executing said second reception operation; and
         a host device control unit for executing said second control operation to activate in parallel through time-sharing using a further integrated mode said host device transmission unit and said host device reception unit.

2. An information processing system according to claim 1, wherein:
   said peripheral device transmission unit is further for affixing a first destination data indicative of said first activation unit to said first data, and for affixing a second destination data indicative of said second activation unit to said second data,
   said peripheral device transmission unit is for executing said first transmission operation to transmit in parallel through time-sharing in the integrated mode said first data affixed with said first destination data and said second data affixed with said second destination data,
   said host device transmission unit is further for affixing a third destination data indicative of said first activation unit to said third data, and for affixing a fourth destination data indicative of said second activation unit to said fourth data,
   said host device transmission unit is for executing said second transmission operation to transmit in parallel through time-sharing in the integrated mode said third data affixed with said third destination data and said fourth data affixed with said fourth destination data,
   said peripheral device reception unit is further for identifying said third data based on said third destination data, for identifying said fourth data based on said fourth destination data, for sending said third data to said first processor unit and for sending said fourth data to said second processor unit, and
   said host device reception unit is further for identifying said first data based on said first destination data, for identifying said second data based on said second destination data, for sending said first data to said first activation unit, and for sending said second data to said second activation unit.

3. An information processing system according to claim 2, wherein:

said first data affixed with said first destination data is divided into first data packets having a predetermined size, each of said first data packets including a first header part and a first data part, said first header part including a first identification flag and first data size information;

said second data affixed with said second destination data is divided into second data packets having a predetermined size, each of said second data packets including a second header part and a second data part, said second header part including a second identification flag and second data size information;

said third data affixed with said third destination data is divided into third data packets having a predetermined size, each of said third data packets including a third header part and a third data part, said third header part including a third identification flag and third data size information; and said fourth data affixed with said fourth destination data is divided into fourth data packets having a predetermined size, each of said fourth data packets including a fourth header part and a fourth data part, said fourth header part including a fourth identification flag and fourth data size information.

4. An information processing system according to claim 3, wherein:

said multifunction peripheral device executes said first transmission operation to transmit said first data packets together with said second data packets; and said multifunction peripheral device executes said second transmission operation to transmit said third data packets together with said fourth data packets.

5. An information processing system according to claim 4, wherein:

said multifunction peripheral device executes said first transmission operation and said first reception operation at a predetermined time interval; and said host device executes said second transmission operation and said second reception operation at a predetermined time interval.

6. An information processing system according to claim 1, wherein:

said multifunction peripheral device further includes a third processor unit;

said host device further includes a third activation unit for activating said third processor unit;

wherein:

said multifunction peripheral device is for executing said first transmission operation to transmit in parallel through time-sharing in the integrated mode said first data from said first processor unit, said second data from said second processor unit and a fifth data in a form of data packets from said third processor unit to said host device, and for executing said first reception operation to receive in parallel through time-sharing in the integraed mode said third data from said first activation unit, said fourth data from said second activation unit and a sixth data in a form of data packets from said third activation unit, and said host device is for executing said second transmission operation to transmit in parallel through time-sharing in the integrated mode said third data from said first activation unit, said fourth data from said second activation unit and said sixth data from said third activation unit to said multifunction peripheral device, and for executing a second reception operation to receive in parallel through time-sharing in the integrated mode said first data from said first processor unit, said second data from said second processor unit and said fifth data from said third processor unit.

7. An information processing system according to claim 6, wherein:

said first processor unit is an image generation unit;

said second processor unit is a document scanning unit; and said third processor unit is a facsimile unit for receiving facsimile data from the outside.

8. A multifunction peripheral device for executing mutually different functions by exchanging data with a computer, said device comprising:

a first processor unit;

a second processor unit;

a transmission unit for executing a transmission operation to transmit in parallel through time-sharing a first data from a first processor unit and a second data from a second processor unit to a computer;

a reception unit for executing a reception operation to receive in parallel through time-sharing a third data from a first activation unit of said computer and a fourth data from a second activation unit of said computer; and a control unit for controlling said transmission operation of said transmission unit and said reception operation of said reception unit through time-sharing.

9. A multifunction peripheral device according to claim 8, wherein:

said transmission unit is further for affixing a first destination data indicative of said first activation unit to said first data, and for affixing a second destination data indicative of said second activation unit to said second data, said transmission unit is for executing said first operation to transmit in parallel through time-sharing said first data affixed with said first destination data and said second data affixed with said second destination data, and said reception unit is further for identifying said third data based on a third destination data affixed to said third data, for identifying said fourth data based on a fourth destination data affixed to said fourth data, for sending said third data to said first processor unit and for sending said fourth data to said second processor unit.

10. A multifunction peripheral device according to claim 9, wherein:

said first data affixed with said first destination data is divided into first data packets having a predetermined size, each of said first data packets including a first header part and a first data part, said first header part including a first identification flag and first data size information; and said second data affixed with said second destination data is divided into second data packets having a predetermined size, each of said second data packets including a second header part and a second data part, said second header part including a second identification flag and second data size information.

11. A multifunction peripheral device according to claim 8, wherein:

said transmission unit executes said transmission operation to transmit said first data packets together with said second data packets.

12. A computer program product for driving a computer that has a first activation unit for activating a first processor unit of a multifunction peripheral device and a second activation unit for activating a second processor unit of said multifunction peripheral device, said computer program product comprising:

a computer usable medium having computer readable program code means embodied therein for causing said computer to communicate with said multifunction peripheral device, said computer program product having:

computer readable program code means for causing said computer to perform a first time-sharing operation to transmit in parallel through time-sharing a first data from said first activation unit and a second data from said second activation unit to said multifunction peripheral device;

computer readable program code means for causing said computer to perform a second time-sharing operation to receive in parallel through time-sharing a third data from said first processor unit and a fourth data from said second processor unit; and computer readable program code means for causing said computer to perform a third time-sharing operation to execute said first time-sharing operation in parallel with said second time-sharing operation through time-sharing.

13. A computer program product according to claim 12, said product further comprising:

computer readable program code means for causing said computer to affix a first destination data indicative of said first activation unit to said first data that is to be transmitted to said multifunction peripheral device;

computer readable program code means for causing said computer to affix a second destination data indicative of said second activation unit to said second data that is to be transmitted to said multifunction peripheral device;

computer readable program code means for causing said computer to distinguish between said third data and said fourth data based on a third destination data affixed to said third data and a fourth destination data affixed to said fourth data; and computer readable program code means for causing said computer to send said third data to said first activation unit and to send said fourth data to said second activation unit.

14. A computer program product according to claim 13, said product further comprising:

computer readable program code means for causing said computer to receive an allowance signal from said multifunction peripheral device that indicates said multifunction peripheral device is ready to transmit and receive data before performing said first time-sharing operation or said second time-sharing operation; and computer readable program code means for causing said computer to send a close signal to said multifunction peripheral device to indicate the end of said first time-sharing operation and said second time-sharing operation.

* * * * *